(12) United States Patent
Siemens et al.

(10) Patent No.: US 6,690,771 B2
(45) Date of Patent: Feb. 10, 2004

(54) SYSTEM AND METHOD FOR ANSWERING MACHINE CALL SCREENING IN A CORDLESS DIGITAL SYSTEM

(75) Inventors: Gerhard Siemens, Borken (DE); Uwe Sydon, Duesseldorf (DE); Holger Steinbach, Round Rock, TX (US); Olaf Dicker, Rees (DE); Juergen Kockmann, Duesseldorf (DE)

(73) Assignee: Siemens Information & Communication Mobile, LLC, San Diego, CA (US)

( * ) Notice: Subject to any disclaimer, the term of this patent is extended or adjusted under 35 U.S.C. 154(b) by 158 days.

(21) Appl. No.: 09/884,413

(22) Filed: Jun. 18, 2001

(65) Prior Publication Data

US 2002/0003866 A1 Jan. 10, 2002

Related U.S. Application Data

(63) Continuation-in-part of application No. 09/779,014, filed on Feb. 7, 2001.
(60) Provisional application No. 60/213,722, filed on Jun. 22, 2000.

(51) Int. Cl.$^7$ ................................. H04M 1/64
(52) U.S. Cl. ...................... 379/67.1; 379/170; 455/462
(58) Field of Search ..................... 379/67.1, 20, 74, 379/88.12, 159, 164, 170, 167.01, 171, 172, 176, 372, 373.05; 455/462, 463, 464, 465, 567, 569

(56) References Cited

U.S. PATENT DOCUMENTS

| | | | | | |
|---|---|---|---|---|---|
| 4,677,655 | A | * | 6/1987 | Hashimoto | 455/412 |
| 4,881,259 | A | * | 11/1989 | Scordato | 455/412 |
| 6,104,923 | A | * | 8/2000 | Kite | 455/412 |
| 6,148,213 | A | * | 11/2000 | Bertocci et al. | 455/462 |
| 6,256,354 | B1 | * | 7/2001 | Yoshida et al. | 375/244 |
| 6,389,125 | B1 | * | 5/2002 | Ubowski | 379/142.12 |
| 6,463,129 | B1 | * | 10/2002 | Park | 379/67.1 |
| 2001/0014599 | A1 | * | 8/2001 | Henderson | 455/412 |

* cited by examiner

Primary Examiner—Scott L. Weaver

(57) ABSTRACT

A system and method for call screening in a wireless telephone system. When a call is received on an answering machine (17) associated with a base part (11), the user at a portable part (12) may select a call screen button (19). The resulting signal is received at the base part (11), which then enters a broadcast mode. The incoming answering machine message is broadcast to all handsets (12, 14, 16). In a TDMA system, an audio message is broadcast from a base part (11) during a single time slot of a time division. The user at a particular portable part may then select a pick up button to pick up the call.

19 Claims, 5 Drawing Sheets

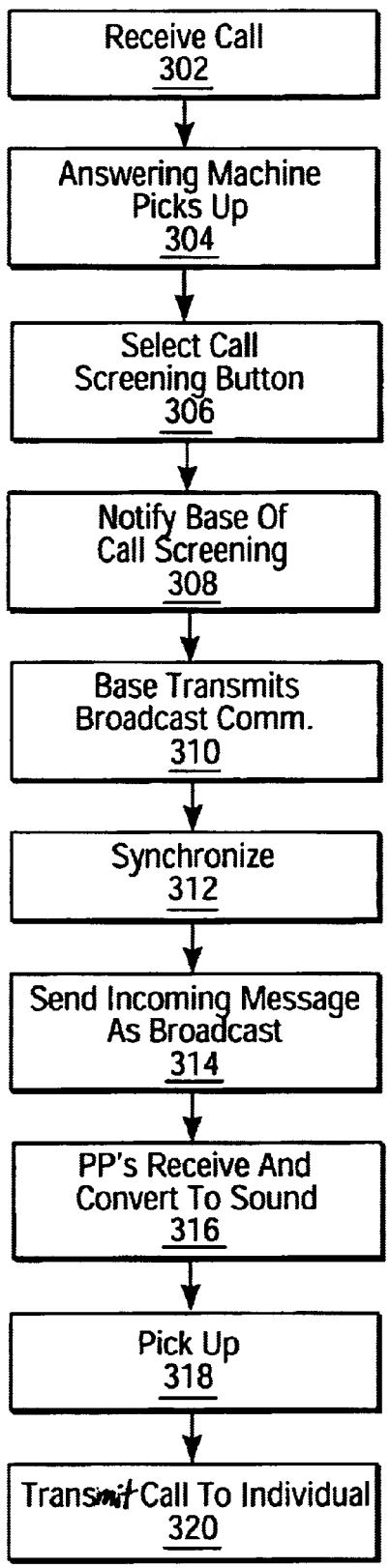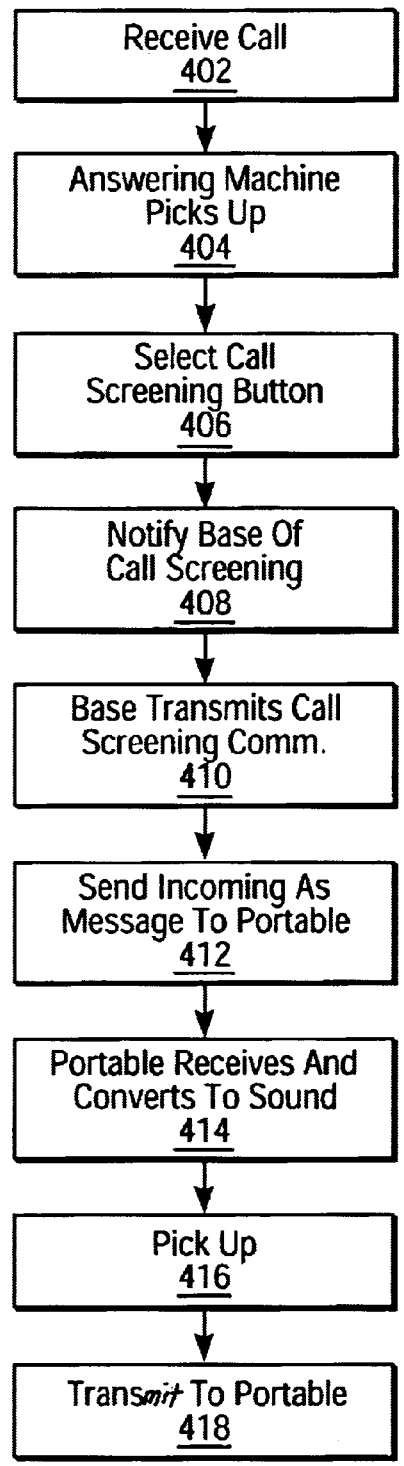
FIG. 3
FIG. 4

SYSTEM AND METHOD FOR ANSWERING MACHINE CALL SCREENING IN A CORDLESS DIGITAL SYSTEM

CROSS REFERENCE TO RELATED APPLICATIONS

This application claims priority from U.S. Provisional Application Serial No. 60/213,722, filed, Jun. 22, 2000, which is hereby incorporated by reference in its entirety as if fully set forth herein. This application is a continuation-in-part of U.S. application Ser. No. 09/779,014, filed, Feb. 7, 2001, titled "Audio Broadcast in Cordless Digital System".

BACKGROUND OF THE INVENTION

The present invention relates to personal telephone systems that are able to transmit and receive digital signals between fixed sets and fixed stations in a cordless system. More particularly, the present invention relates to answering machine call screening on such cordless telephone systems.

Cordless systems, such as time division multiple access (TDMA) cordless phone systems, provide a base unit which is able to provide connections for a plurality of mobile units, such as handsets. Such TDMA systems use time division to provide a plurality of slots, where the base (fixed part (FP)) transmits to an individual (portable part (PP)) mobile unit during a particular slot of time and receives from the individual mobile unit during a particular slot of time. Exemplary TDMA standards include WDCT, HOME-RF, and Bluetooth. One standard for TDMA systems is the Digital European Cordless Telecommunications DECT Common interface standard described in ETS 300 175-2 and ETS 300 175-3, published by the European Telecommunication Standards Institute. The DECT standard is also discussed in U.S. Pat. No. 6,078,574 entitled "PROCESS AND APPARATUS FOR ACTION CONTROL IN A TIME SLOT METHOD", to Boetzel et al. issued Jun. 20, 2000 and U.S. Pat. No. 6,088,338 entitled "METHOD AND SYSTEM FOR THE DETERMINATION OF THE PSCN PARAMETER STARTING FROM THE MFN PARAMETER IN A DECT CORDLESS TELEPHONE SYSTEM" to Rossella et al. issued Jul. 11, 2000, which are incorporated by reference.

Non-cordless telephones that provide answering machine capability provide a feature known as call screening. Generally, this allows the user to listen to the party who is leaving a message on the answering machine before picking up, or instead of picking up. Typically, however, cordless telephones do not allow for answering machine call screening from the cordless units. As such, there is a need for a cordless system to provide for answering machine call screening.

SUMMARY OF THE INVENTION

To achieve the foregoing and other objects and in accordance with the purpose of the present invention, a system and method for answering machine call screening is provided.

According to one embodiment of the invention, when a call is received on an answering machine associated with a base part, the user at a portable part may select a call screen button. The resulting signal is received at the base part, which then enters a broadcast mode. The incoming answering machine message is broadcast to all handsets. In a TDMA system, an audio message is broadcast from a base part during a single time slot of a time division. The user at a particular portable part may then select a pick up button to pick up the call.

According to another embodiment of the invention, when the answering machine picks up, the user of a portable part can select the call screen button. The answering machine screening message is then transmitted to the user only, rather than broadcast to all the portable parts. The user at the portable part may then select a pick up button to pick up the call.

According to other embodiments of the present invention, the fixed part and the portable parts are individually and/or collectively configurable to automatically provide call screening. For example, at the fixed part, the user may use a set of key or menu commands that activate the call screening functionality. Similarly, at one or more of the portable parts, the user may configure the portable part for call screening. In certain embodiments, the configuration information may also be transmitted from the fixed part to the selected portable part and/or vice versa.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a flowchart of a method according to an embodiment of the invention.

FIG. 4 is a flowchart of a method according to another embodiment of the invention.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
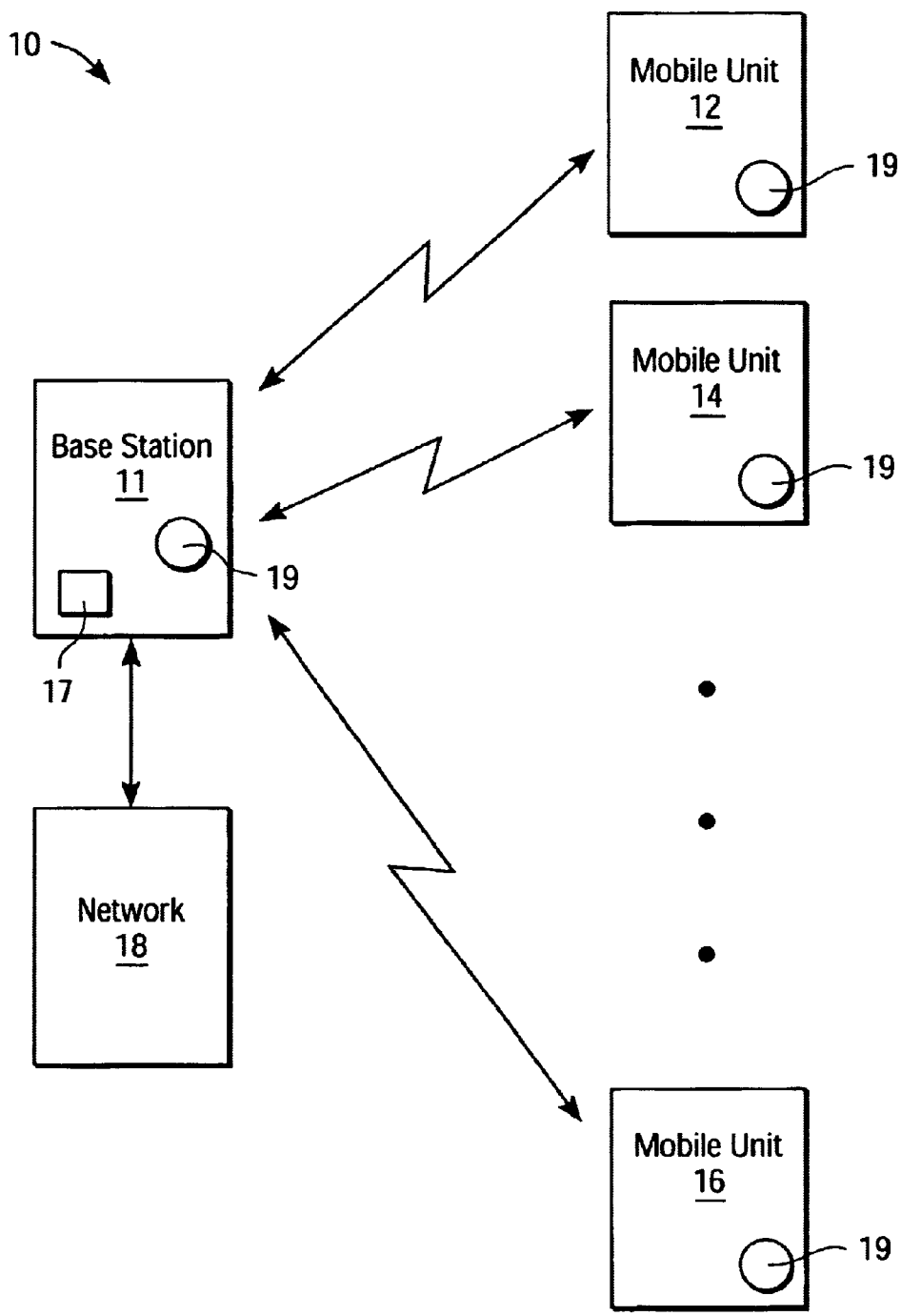
FIG. 1 is a schematic view of a cordless system according to an embodiment of the invention.

To facilitate discussion, FIG. 1 is a schematic view of a cordless system 10, such as a cordless telephone system that utilizes the invention. The cordless system 10 includes a base part 11 and a plurality of portable parts 12, 14, 16. The base part 11 of the cordless system 10 is connected to a network 18. The plurality of portable parts 12, 14, 16 communicate with the base part 11, which provides communications between the plurality of portable parts 12, 14, 16 and the network 18. Although only three portable parts 12, 14, 16 are illustrated more than three portable parts are possible. For example there may be twelve portable parts communicating to the base part 11. In this embodiment of the invention, time division multiple access (TDMA) is used to provide communication between each of the plurality of portable parts 12, 14, 16 and the base part 11. The base part 11 further includes an answering machine 17. Further, as will be explained in greater detail below, the base part 11 and the plurality of portable parts 12, 14, 16 each may be provided with a call screening button 19.

Figure 2:
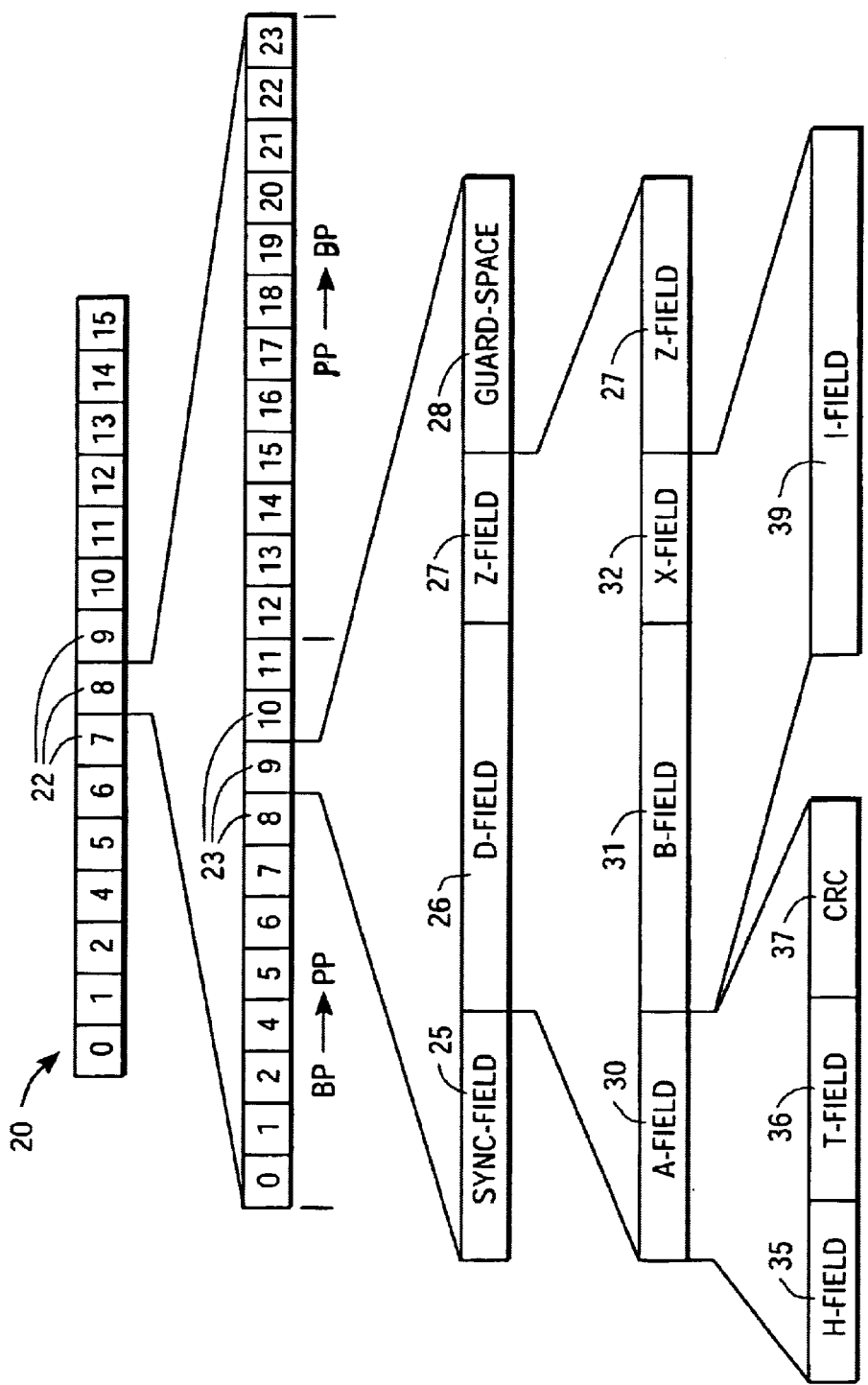
FIG. 2 shows a DECT frame structure usable by embodiments of the invention.

FIG. 2 illustrates a DECT frame structure that uses TDMA and may be used in an embodiment of the invention. A multiframe 20 may contain sixteen frames 22. Each frame 22 of the multiframe 20 may be 10 ms (milliseconds). Each frame 22 of the multiframe 20 may be split into two sets of twelve full slots 23 of equal size. The slots 23 may be time slots. The base part 11 may transmit to the plurality of portable parts 12, 14, 16 for the first 5 ms., corresponding to slots 0 to 11 (illustrated as the BP→PP (base part to portable part transmission)). For the second 5 ms., corresponding to slots 12 to 23 (illustrated as the PP→BP (base part to portable part transmission)) the base part may receive from the plurality of portable parts 12, 14, 16. A pair of time slots 23, such as slots 0 and 12, or 1 and 13 for transmitting and receiving may form a connection (channel). Each portable part 12, 14, 16 may be assigned a slot 23 from the first 5 ms. and a slot 23 from the second 5 ms., so that each portable part 12, 14, 16 may be assigned a channel. Since there are twelve channels, the base part 11 may accommodate twelve portable parts.

Each time slot 23 may last for 416 µs, which may correspond to 480 bits. Each time slot may be split into a 32 bit synchronization field (sync-field) 25, a 388 bit D-field 26, a four bit Z-field 27, and a 56 bit guard space 28. The D-field 26 may comprise a 64 bit A-field 30, a 320 B-field 31, and a four bit X-field 32. The A field 30 may comprise an eight bit header (H-field) 35, a forty bit tail (T-field) 36, and a 16 bit redundancy (CRC) 37. The B-field 31 may comprise a 320 bit information field (I-field) 39. The I-field 39 may be used to carry data, such as part of a digitized audio message. The header 35 may describe the information in the tail 36. Various commands and command information, such as identification commands, frequency information, slot/frame information, and slot commands may be placed in the tail 36. The base part 11 and portable parts 12, 14, 16 receive messages and process the commands in the tail 36.

FIG. 3 is a high level flow chart of a method used in one embodiment of the invention. In particular, FIG. 3 describes a method in which a call screening answering machine message is broadcast to all active handsets associated with a cordless system. In a step 302, a call is received at the base station 11. For example, the call may be received from the public switched telephone network (PSTN). In 304, the answering machine 17 picks up, plays its greeting and allows the caller to deliver the message. In 306, a call screening button 19 is selected. Any or all of the base part 11 and the portable parts 12, 14, 16 may have call screening buttons 19, that allow either the base part 11 or one of the portable parts 12, 14, 16 to select call screening. The call screening button 19 may be a button dedicated only to call screening or one or more general purpose buttons, which may be pushed in a special sequence for call screening. If a user of a portable part (e.g., portable part 12), selects the call screening button, and if the portable part is not already on and synchronized to the base part, such synchronization would be made to occur.

The base part 11 is notified of the selection of the call screening button 19 in step 308. It is noted that, if the call screening button 19 on the base part 11 is selected, then the selection of the call screening button 19 is noted by the base part 11. If the call screening button 19 on one of the portable parts 12, 14, 16 is selected, a call screening command may be placed in the T-field 36 of a message sent to the base part 11. The base part 11 is then notified of the selection of the call screening button 19. In this example, the call screening button 19 for the first portable part 12 is selected, where the first portable part uses slots 1 and 13. The base part 11 receives a message during slot 13 with a call screening command in the T-field 36, which the base part 11 recognizes as a call screening request from the first portable part 12.

The base part 11 then transmits a call screening command in step 310. In this example, the base part 11 transmits call screening command messages during slots 0 and 2–11 with a call screening command in the T-field with a slot designation, for example slot 4. The remaining plurality of portable parts 14, 16 receive the call screening command messages. The call screening command in the T-field causes the remaining plurality of portable parts 14, 16 to go a receive only mode and become synchronized to receive signals from the designated slot, in this example slot 4, in step 312.

In step 314, the base part 11 then sends broadcast messages with the answering machine digitized audio in the I-field during slot 4, thus rebroadcasting the answering machine audio message (step 316). Since the remaining plurality of portable parts 14, 16 are in a receiving mode and synchronized with slot 4, all of the remaining plurality of portable parts 14, 16 receive the audio message in step 316 and access the digital data in the I-field 39 to convert the audio message to sound.

In step 318, any of the portable parts or the base part 11 may terminate the broadcast call screening mode by picking up the call. If portable part 12 picks up, then the call is connected with the particular portable part 12. The other portable parts may be disconnected by having the base part 11 transmit a message that commands the remaining plurality of portable parts 14, 16 to synchronize with different slots.

If the call screening button 19 on the base part 11 is selected, then the broadcast call screening audio message is generated at the base part 11. In such a case, the broadcast call screening message is not received by the base part 11 through one of the slots.

In one embodiment of the invention, if a portable part of the remaining plurality of portable parts is busy (i.e. Is being used for a telephone conversation) that portable part will ignore the broadcast message.

Turning now to FIG. 4, a flowchart illustrating a method according to another embodiment of the invention is shown. In particular, FIG. 4 illustrates a method in which a call screening message is transmitted only to the requesting portable part. In a step 402, a call is received at the base station 11. For example, the call may be received from the public switched telephone network (PSTN). In 404, the answering machine 17 picks up, plays its greeting and allows the caller to deliver the message. In 406, a call screening button 19 on one of the portable parts (say, portable part 12) is selected. As in the embodiment described above, the call screening button 19 may be a button dedicated only to call screening or one or more general purpose buttons, which may be pushed in a special sequence for call screening. If the user of the portable part (e.g., portable part 12) selects the call screening button, and if the portable part is not already on and synchronized to the base part, such synchronization would be made to occur.

The base part 11 is then notified of the selection of the call screening button 19 in step 408. In this example, the call screening button 19 for the first portable part 12 is selected, where the first portable part uses slots 1 and 13. The base part 11 receives a message during slot 13 with a call screening command in the T-field 36, which the base part 11 recognizes as a call screening request from the first portable part 12. In step 412, the base part 11 then sends a message with the answering machine digitized audio in the I-field during slot 4, thus transmitting the answering machine audio message (step 414) to the portable part 12. In step 416, the portable part 12 may terminate the call screening mode by picking up the call. If portable part 12 picks up, then the call is connected with the particular portable part 12.

The network 18 may be a regular telephone system. In the alternative, the network 18 may form a network of base parts. Such a network may form a large network of base parts communicating with portable parts. In such a situation, it may be desirable to provide an audio broadcast of the call screening message to portable parts associated with all of the base parts. In such a case, the base part 11 may also send the audio message to the network 18 of base parts, which broadcast the audio message to the portable parts using the above mentioned method.

Figure 5:
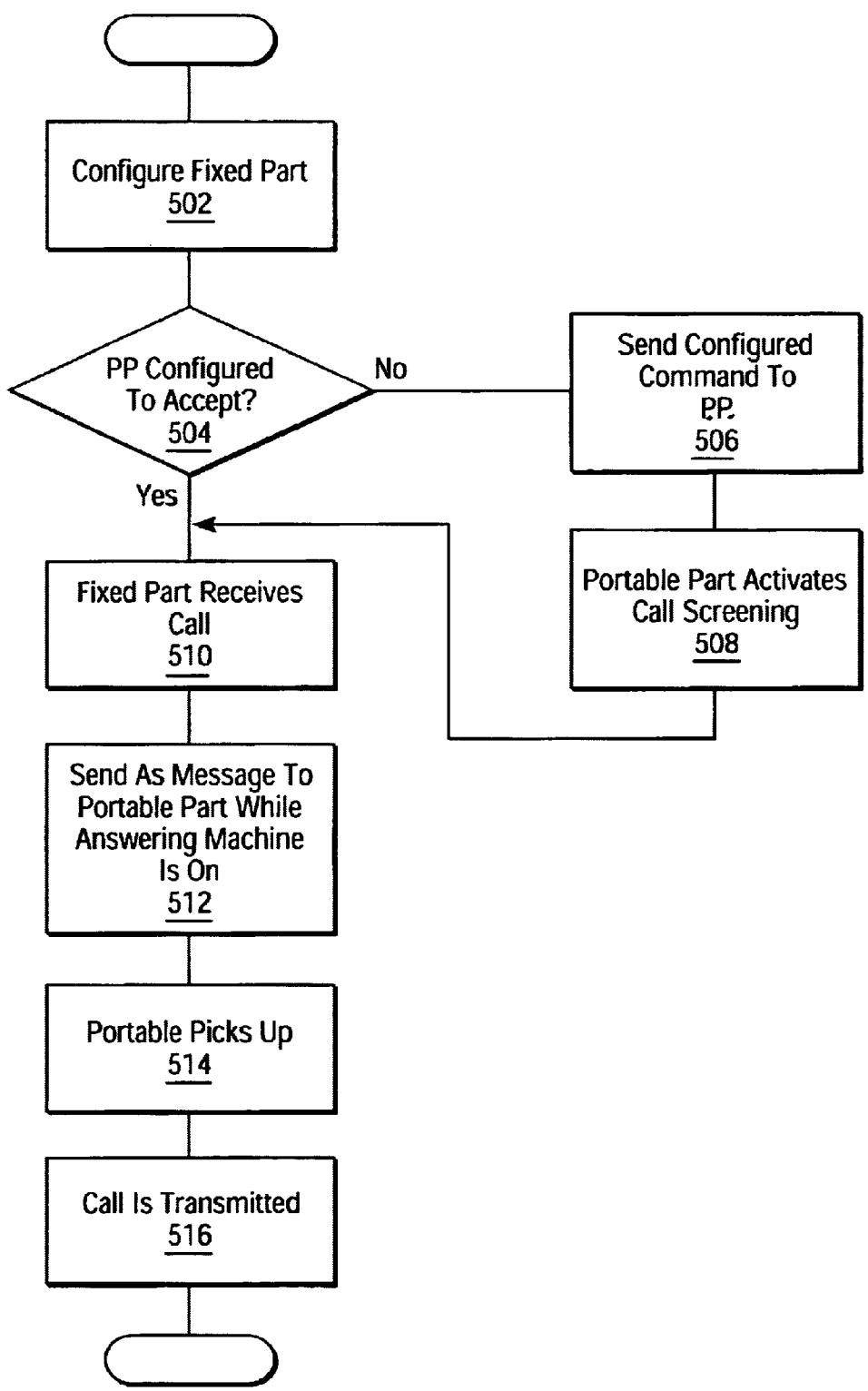
FIG. 5 is a flowchart of a method according to another embodiment of the invention.

FIG. 5 is a flowchart of a method according to another embodiment of the invention. More particularly, in the method of FIG. 5, the base part 11 is configured or initialized to implement call screening such that call screening automatically occurs for incoming calls, rather than manually selecting such functionality for each call. In step 502, the user or technician configures the base part 11 to implement call screening. Such configuration may include, for example, the user activating a call screening key 19 or sequence of keys, typically in conjunction with a graphical user interface, such as an LCD display. Alternatively, the user may configure the base part 11 to implement the call screening by using the portable part 12 to send a configuration command to the base part 11. Again, this may be accomplished through activation of one or more keys (this time on the portable part 12) in conjunction with a graphical user interface.

In step 504, the base part 11 determines if the portable parts are configured to accept the call screening messages. If not, then in step 506, the base part 11 sends the portable parts one or more call screening configuration commands. In response, the portable part 12 sets up call screening functionality in step 508. It is noted that in other embodiments, the portable parts 12, 14, 16 may automatically accept call screening once the base part 11 is configured, or may be separately configured. Thus, steps 504–508 may be omitted.

Once the call screening functionality has been configured, call screening processing is generally similar to that described above. Thus, in step 510, the base part 11 receives a call from, for example, the PSTN. The base part 11 activates the answering machine 17 and sends the incoming voice signal as a message to the portable part 12, in step 512. In step 514, the user may pick up the incoming screened message, for example, by pressing a key on the portable part 12. Finally, if selected, the base part 11 will then send the call to the portable part 12, in step 516.

Figure 6:
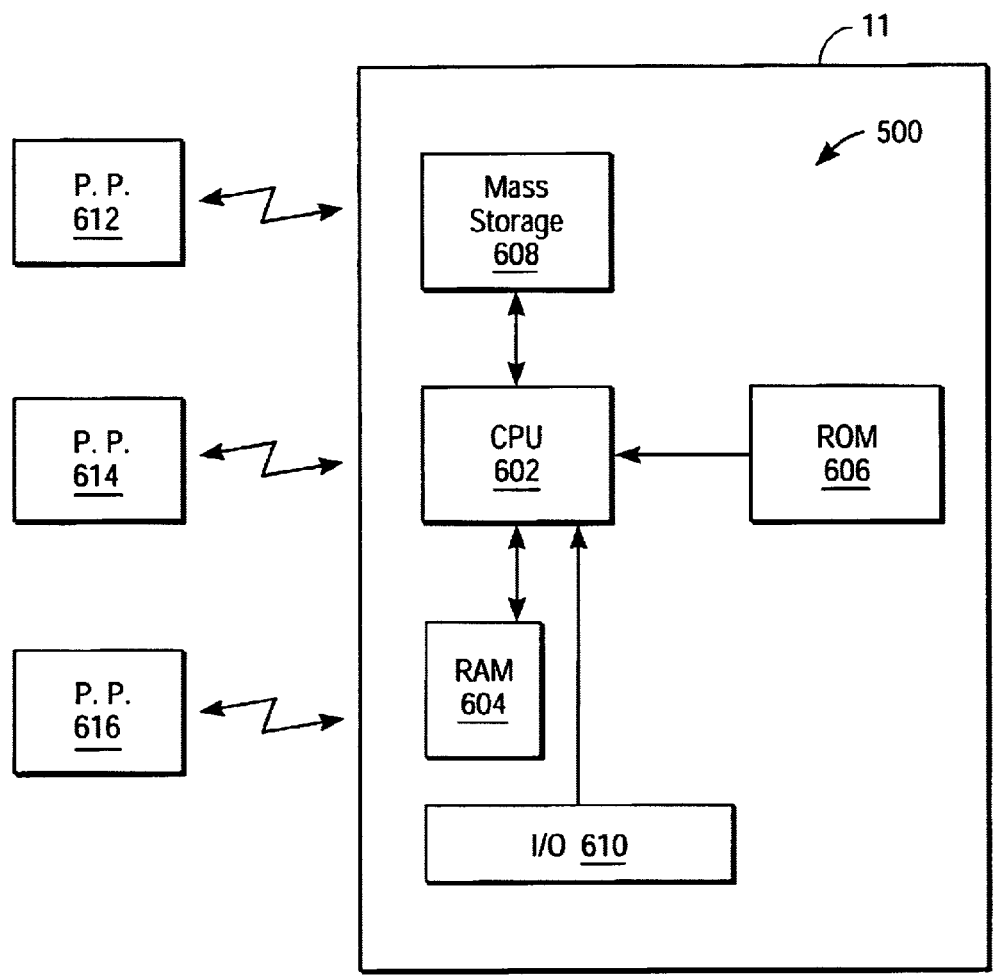
FIG. 6 is a schematic view of a computer that may be used in the base part and the portable parts.

A representative computer or processor 600 shown schematically in FIG. 6 may be placed in the base part 11 and each of the portable, or mobile, parts 612, 614, 616 (which are substantially similar to portable parts 12, 14 and 16 previously discussed with respect to FIG. 1) where each computer allows the base part 11 and portable parts 612, 614, 616 to process the frames and commands in the frames. Computer 600 includes a central processing unit (CPU) 602, which may be a single chip or part of a single chip and which may be coupled bidirectionally with random access memory (RAM) 604 and unidirectionally with read only memory (ROM) 606. Typically, RAM 604 is used as a "scratch pad" memory and includes programming instructions and data, including distributed objects and their associated code and state, for processes currently operating on CPU 602. ROM 606 typically includes basic operating instructions, data and objects used by the computer to perform its functions. In addition, a mass storage device 608, such as a hard disk, CD ROM, magneto-optical (floptical) drive, tape drive or the like, may be coupled bidirectionally with CPU 602. Mass storage device 608 generally may include additional programming instructions, data and objects that typically are not in active use by the CPU, although the address space may be accessed by the CPU, e.g., for virtual memory or the like. To provide compactness to the base part and portable parts, mass storage may be omitted. Each of the above described computers optionally may include an input/output source 610 that typically includes input media such as a keyboard, pointer devices (e.g., a mouse or stylus) and/or network connections which may form other parts of the base part or portable parts. The CPU and associated commands may be used to provide the inventive base and portable part functions described above.

While this invention has been described in terms of several preferred embodiments, there are alterations, permutations, and substitute equivalents which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

What is claimed is:

1. A telecommunications system, comprising:
   a base part with an associated answering machine, said answering machine adapted to record incoming calls; and
   a plurality of portable parts adapted to receive an audio message from said base part while said calls are being received into said answering machine;
   wherein the plurality of portable parts are synchronized to a single time slot.

2. A system as recited in claim 1, wherein said base part is adapted to generate an answering machine call screening command and transmit the answering machine call screening command to the plurality of portable parts.

3. A system, as recited in claim 1 wherein one of said portable parts is adapted to transmit an answering machine call screening origination signal to a base part; and
   the base part is adapted to transmit the audio message to the portable part responsive to the answering machine call screening origination signal.

4. A telecommunications system comprising:
   a base part with an associated answering machine said answering machine adapted to record incoming calls; and
   at least one portable part adapted to receive an audio message from said base part while said calls are being received into said answering machine
   wherein said base part is adapted to broadcast said audio message to a plurality of said portable parts;
   wherein said base part is adapted to generate an answering machine call screening command and transmit the answering machine call screening command to the plurality of portable parts;

wherein the plurality of portable parts are synchronized to a single time slot.

5. A method in a telecommunications system having a base part with an answering machine and a plurality of portable parts, comprising:

receiving a call into said answering machine; and transmitting an audio message from a base part during a single time slot of a time division while said call is being received into said answering machine;

receiving the audio message at one or more of the plurality of portable parts; and picking up said call from said one or more of the plurality of portable parts while said call is being recorded at said answering machine.

6. The method, as recited in claim 5, wherein said transmitting comprises broadcasting said audio message to a plurality of said portable parts.

7. The method as recited in claim 6, further comprising:

generating an answering machine call screening command at said base part; and transmitting the answering machine call screening command to the plurality of portable parts.

8. The method, as recited in claim 7, further comprising synchronizing the plurality of portable parts to the single time slot.

9. The method, as recited in claim 8, wherein generating an answering machine call screening command comprises designating the single time slot.

10. The method, as recited in claim 9, wherein before the base part and the plurality of portable parts form a time division multiple access cordless telephone system.

11. The method, as recited in claim 5, further comprising:

originating answering machine call screening origination signal at one of said portable parts;

transmitting a answering machine call screening origination signal from the additional portable part to the base part; and transmitting the audio message from the base part to the portable part responsive to the answering machine call screening origination signal.

12. The method, as recited in claim 5, wherein before the transmitting the answering machine call screening command from the base part, each portable part is assigned a time slot, wherein at least one portable part is assigned a time slot other than the designated slot, so that before the transmitting the answering machine call screening command at least one portable part does not broadcast audio messages during the designated time slot.

13. A method, comprising:

providing a base part with an associated answering machine, said answering machine adapted to record incoming calls; and providing at least one portable part synchronized to a predetermined time slot adapted to receive an audio message from said base part while said calls are being received into said answering machine.

14. A method as recited in claim 13, wherein said base part is adapted to broadcast said audio message to a plurality of said portable parts.

15. A method as recited in claim 14, wherein said base part is adapted to generate an answering machine call screening command and transmit the answering machine call screening command to the plurality of portable parts.

16. A method, as recited in claim 13 wherein one of said portable parts is adapted to transmit an answering machine call screening origination signal to the base part; and the base part is adapted to transmit the audio message to the portable part responsive to the answering machine call screening origination signal.

17. A method comprising:

providing a base part with an associated answering machine, said answering machine adapted to record incoming calls; and providing at least one portable part adapted to receive an audio message from said base part while said calls are being received into said answering machine;

wherein said base part is adapted to broadcast said audio message to a plurality of said portable parts;

wherein said base part is adapted to generate an answering machine call screening command and transmit the answering machine call screening command to the plurality of portable parts;

wherein the plurality of portable parts are synchronized to a single time slot.

18. A method in a telecommunications system having a base part with an answering machine and a plurality of portable parts, comprising:

receiving a call into said answering machine; and transmitting an audio message from a base part during a predetermined time slot of a time division while said call is being received into said answering machine;

receiving the audio message at one or more of the plurality of portable parts; and picking up said call from said one or more of the plurality of portable parts while said call is being recorded at said answering machine.

19. A telecommunications system, comprising:

a base part with an associated answering machine, said answering machine adapted to record incoming calls; and a plurality of portable parts adapted to receive an audio message from said base part while said calls are being received into said answering machine;

wherein the plurality of portable parts are synchronized to a predetermined time slot.

* * * * *